United States Patent [19]

Rothbühr et al.

[11] 4,282,198
[45] Aug. 4, 1981

[54] PROCESS FOR THE PRODUCTION OF HIGH QUALITY CARBON BLACK

[75] Inventors: Lothar Rothbühr, Hermülheim; Werner Sroka, Brühl; Walter Fritz, Stein, all of Fed. Rep. of Germany

[73] Assignee: Deutsche Gold- und Silber-Scheideanstalt vormals Roessler, Frankfurt, Fed. Rep. of Germany

[21] Appl. No.: 109,540

[22] Filed: Jan. 4, 1980

Related U.S. Application Data

[62] Division of Ser. No. 962,187, Nov. 20, 1978, Pat. No. 4,225,416, which is a division of Ser. No. 735,888, Oct. 26, 1977, Pat. No. 4,154,808.

[30] Foreign Application Priority Data

Oct. 24, 1975 [DE] Fed. Rep. of Germany ....... 2547679

[51] Int. Cl.$^3$ ................ C01B 31/02; C01B 31/00; C09C 1/48

[52] U.S. Cl. ................... 423/445; 423/449; 423/450; 106/307

[58] Field of Search ............... 423/445, 449, 450, 455, 423/456, 460, 461; 106/307

[56] References Cited

U.S. PATENT DOCUMENTS

| 2,964,460 | 12/1960 | Neuworth | 423/450 |
| 3,132,926 | 5/1964 | Ruble | 423/450 |
| 3,989,803 | 11/1976 | Henderson | 423/450 |

Primary Examiner—O. R. Vertiz
Assistant Examiner—Gregory A. Heller
Attorney, Agent, or Firm—Cushman, Darby & Cushman

[57] ABSTRACT

High quality carbon black forming material convertible with high yield into furnace black having a high abrasion resistance in rubber is prepared by dissolving pitch with conventional thinly liquid carbon black feed stock and mechanically separating suspended matter from the mixture obtained.

12 Claims, No Drawings

PROCESS FOR THE PRODUCTION OF HIGH QUALITY CARBON BLACK

This is a division of application Ser. No. 962,187 filed Nov. 20, 1978 now U.S. Pat. No. 4,225,416 which is a division of application Ser. No. 735,888 filed Oct. 26, 1977 and now U.S. Pat. No. 4,154,808.

The most important process for the production of carbon black for the rubber, synthetic resin and pigment industries today is the furnace black process. The increasing demands of the tire industry particularly cause a steadily increasing carbon black production. Parallel to the increasing consumption of carbon black there also arises a growing demand for usable carbon black feedstocks. Because of the energy crisis there has arisen a deficiency situation in this area. The process of the present invention widens the base of very high quality carbon black feedstocks.

In the production of furnace black hot combustion gases are produced by burning of a fuel into which there is sprayed a hydrocarbon. In an endothermic reaction the hydrocarbon vaporizes and decomposes into carbon (carbon black) and hydrogen. It has been shown that not all hydrocarbons are suited in an equal measure for the production of carbon black. In principle there exist gaseous, liquid and solid hydrocarbons. The arrangement is somewhat fluid since the temperature has an influence on the state of aggregation. Apart from a few exceptions the liquid carbon black feedstocks have proven as the best suited for the production of furnace black. On account of the low density with gaseous hydrocarbon the carbon concentration per unit of volume is very low. On the contrary with solid hydrocarbons (solid at 100°–200° C.) the conversion into the gas phase, which precedes the formation of carbon black, is too slow.

However, the liquid hydrocarbons also are in no way equally suited for the production of carbon black. In a time of economical use of energy source the carbon black feedstock is preferred which permits under comparable production conditions the highest carbon black yield per unit of time and the highest yield, i.e., per kilogram of carbon black feedstock employed the formation of the largest amount of carbon black. From experience several characteristics have become evident which are able to characterize the value of a carbon black feedstock for the production of carbon black.

One of these characteristics is the specific gravity of the liquid hydrocarbon, which can be easily measured with pycnometers or hydrometers. A further important characteristic is the ratio of carbon atoms to hydroen atoms, in the carbon black feedstock designated for short as the C/H ratio. This ratio can be easily calculated from an elemental analysis of the carbon black feedstock. In Table 1 there are entered both of these characteristics for the normally employed spectrum of typical high quality carbon black feedstocks. Therein the worldwide most frequently employed carbon black feedstocks for the furnace black process are so presented that the value of the liquid carbon black feedstock increases from the top to the bottom. As a measure of this, there can be applied for example the oil yield in processing under the same conditions to carbon black of the same quality. Thus under specifically defined conditions for example there are obtained from 100 kg. of heavy anthracene oil 41 kg. of carbon black, from aromatic concentrate under the same conditions only 25 kg. of the same carbon black.

A higher density and a higher atomic ratio C/H thus is regarded as a measure for the value or the quality of a feedstock for its suitability as carbon black feedstock. Unfortunately the highest quality feedstocks are only available in a limited amount so that frequently it is necessary to reach back to feedstocks in the upper range of Table 1. In order to expand the range of the highest quality carbon black feedstocks, the idea has been pursued to also incorporate pitch to the base from petroleum products and especially to the base from coal tar in the circle of carbon black feedstocks, as well as to incorporate other residue which have acquired a pitch-like character through previous strong thermal treatment.

For comparison below Table 1 there are entered for comparison with the conventional carbon black feedstocks the test data for a coal tar pitch. According to the previous statements this material must be an excellent carbon black feedstock because of its density and its atomic ratio.

TABLE 1

DENSITY, ELEMENTAL ANALYSIS AND ATOMIC RATIO OF C/H OF FAVORABLE CARBON BLACK FEEDSTOCK AND FROM COAL TAR PITCH

| | Density Referred to 20° C. g/ml | Elemental Analysis in Weight % | | | | | Ratio of C/H Atoms | |
|---|---|---|---|---|---|---|---|---|
| | | C | H | N | S | O | | |
| Aromatic concentrate* | 0.976 | 87.2 | 9.2 | 0.2 | 1.8 | 1.6 | 0.79 | ↑ |
| Steamcracker oil light* | 1.035 | 91.1 | 8.4 | — | 0.1 | 0.4 | 0.91 | Increasing carbon black feedstock |
| Streamcracker oil heavy* | 1.070 | 92.1 | 7.0 | — | 0.1 | 0.9 | 1.10 | quality |
| Anthracene oil light* | 1.085 | 91.0 | 6.2 | 0.8 | 0.6 | 1.4 | 1.22 | ↓ |
| Anthracene oil heavy* | 1.136 | 91.4 | 5.8 | 0.8 | 0.7 | 1.3 | 1.31 | |
| Coal Tar Pitch | 1.279 | 91.9 | 4.3 | 1.2 | 1.0 | 1.6 | 1.78 | |

To be sure it first separates because it is a conchoidal, hard, refractive material and in this form cannot normally be inserted in the normal furnace black reactors. Here there are now carried on the operating directions to pass the solid state of aggregation by dissolving the pitch, e.g., coal tar pitch in other liquid carbon black feedstocks which are present in sufficient amount and, thus to bring it into a form which is better handled.

The following per cent data for the proportions between the materials employed (e.g., steam cracked oil and coal tar pitch) are weight percent.

TABLE 2

| | | Viscosity in cp at 100° C. |
|---|---|---|
| light steamcracker oil | 100% | 25 |
| light steamcracker oil | 80% | 40 |
| coal tar pitch | 20% | |
| light steamcracker oil | 60% | 100 |
| coal tar pitch | 40% | |
| light steamcracker oil | 40% | 300 |

TABLE 2-continued

|  |  | Viscosity in cp at 100° C. |
|---|---|---|
| coal tar pitch | 60% |  |
| coal tar pitch | 100% | 10,000 |

From preceding Table 2 it can be seen that pure coal tar pitch is too highly viscous to be able to be used in pure form industrially. In comparison, by dissolving the pitch in a thin liquid carbon black feedstock the viscosity can be so strongly reduced that an unobjectionable processing can take place. Thus a mixture of 60% light steam cracked oil and 40% coal tar pitch has no higher viscosity than many conventional carbon black feedstocks. The improved chance of obtaining a high oil yield in the production of the carbon black is easily recognized if both important characteristics, the density and atomic C/H ratio before and after the addition of pitch are compared.

TABLE 3

|  | Density Referred to 20° C. g/ml | Atomic C/H Ratio |
|---|---|---|
| light steamcracker oil | 1.035 | 0.91 |
| 60% light steamcracker oil 40% coal tar pitch | 1.133 | 1.26 |

The mixture shifts according to density and atomic C/H ratio in the range between light and heavy anthracene oil, i.e., the highest quality known carbon black feedstocks.

Experiments were carried out with the described mixtures for the production of carbon black. The carbon black yield per unit amount of feedstock is described in this application as yield. The good yields sought have been reached in using the described mixtures, but the carbon black produced had unexpectedly poor properties. If a rubber mixture is prepared with these carbon blacks, these mixtures fail because of an extraordinarily poor abrasion resistance which lies up to 40% below the value reached by normal carbon black feedstocks. This is the real reason why coal tar pitches as well as other pitches previously could not be employed for the production of carbon black.

The invention points out an unexpected way, using the advantages of higher yield, to obtain carbon black feedstocks which permit the production of high quality carbon black. The object of the invention is the development of a process for the production of high quality feedstocks convertible with high yield into furnace black having high abrasion resistance in rubber which process comprises dissolving the pitch feedstock and mechanically separating suspended materials from the mixture obtained.

This process has nothing to do with the already known separation of coarse inorganic impurities from liquid carbon black feedstocks, as takes place for example to avoid injury to the ceramic walls of the carbon black reactor. The process of the invention generally assumes the separation of substantially larger amounts of material than would be necessary in a purification from customary coarse inorganic impurities. Rather a portion of organic suspended material is ascertained in the opaque, black colored liquid mixture obtained by the solution treatment which is found to be separable by centrifuging or filtering. The last mentioned solution by insertion as the carbon black feedstock furnishes not only good carbon black yields and increased hourly carbon black capacity but additionally an unexpected improvement in quality of the carbon black produced in the form of excellent industrial rubber properties, particularly a very high abrasion resistance in rubber mixtures.

It was also found that the content of suspended material of the pitch/carbon black feedstock mixture generally approximates in relation to the content of the mixture which passes as insoluble material in pure benezene, but occurs by highest chance, because any carbon black feedstock has an individual solvent power for pitch which differs from benzene. The content of benzene insolubles of the mixtures prepared according to the invention can be related to their relative evaluation and to optimization of the process of the invention.

The pitch is first subjected to a solvent action according to the process of the invention. Therein the process is preferably carried out by grinding the pitch after coarse comminution, the pitch powder introduced with stirring to the liquid carbon black feedstock heated to a temperature above 100° C., preferably 100° to 150° C., especially 120° C. and then the solvent action discontinued as soon as the residue free mixture passes a sieve with a mesh width of about 0.4 mm.

The carbon black forming oil (feedstock) should have a relatively low viscosity; at best there is used a carbon black feedstock having a viscosity between 5 and 30 cp.

For the mechanical separation of suspended matter there have primarily been found advantageous the use of centrifuges with number of revolutions per minute between 3,000 and 60,000 according to the diameter of the rotor, preferably 6,000 to 45,000, particularly about 40,000 revolutions/min and filters with an average pore width between 3 and $20\mu$, preferably 5 to $10\mu$, particularly around $6\mu$.

According to the mixing ratio between pitch and carbon black forming oil and the type of the latter, there can be required a heating of the mixture before carrying out the separating step. An approved form of the invention therefore provides subjecting a mixture heated to a temperature between 100° and 170° C. to centrifugation or to filtration.

The conditions for the mechanical separation of the suspended matter can be adapted in a suitable manner to the type and composition of the starting pitch and carbon black feedstock in order to obtain an optimum result, i.e., to produce a yield of a carbon black forming material workable to a qualitatively especially high quality carbon black. This is fundamentally attained if the mechanical separation is so carried in reference to temperature of the mixture, number of revolutions of the centrifuge or pore size of the filter and amount of throughput per unit of time that the product of the process accumulates with a content of benzene insoluble below 0.6 weight %, preferably below 0.2 weight %.

Because of its good suitability, availability and economy there is preferably employed in the process coal tar pitch. As the carbon black forming oil (feedstock) primarily there are used thin liquid steamcracker oils or anthracene oils. According to a variant of the invention there is employed as the mixture to be separated mechanically a thermally cracked carbon black forming oil (feedstock) which already contains some pitch. The step of solvent action is thereby eliminated, the already present pitch/carbon black forming oil (feedstock) mixture can be immediately centrifuged or filtered by observing suitable conditions.

The invention is also directed to the carbon black forming oil (feedstock) obtainable by the pictured process as well as their use for the production of improved furnace blacks, especially with high abrasion resistance when used with rubber.

The process of the invention can comprise, consist essentially of or consist of the steps set forth using the materials set forth.

The advantages obtainable by invention are demonstrated and explained below by the examples.

EXAMPLE 1

There was used a lightsteam cracked oil with the following test data:

| Density, referred to: | 20° C. | g/me | 1.035 |
|---|---|---|---|
| Boiling analysis: | 5 Vol% | °C. | 215 |
| | 10 Vol % | °C. | 228 |
| | 20 Vol % | °C. | 237 |
| | 30 Vol % | °C. | 244 |
| | 40 Vol % | °C. | 260 |
| | 50 Vol % | °C. | 289 |
| | 60 Vol % | °C. | 320 |
| | 70 Vol % | °C. | 331 |
| | 80 Vol % | °C. | 392 |
| Distillation residue | weight % | | 11.4 |
| Benzene insolubles | weight % | | 0.0 |
| Elemental analysis: | | | |
| weight % | | carbon | 91.1 |
| | | hydrogen | 8.4 |
| | | nitrogen | — |
| | | sulfur | 0.1 |
| | | oxygen | 0.4 |
| Atomic C/H ratio | | | 0.91 |

Besides there was used a coal tar pitch with the following test data. Because of the high boiling character, a boiling analysis of the pitch is not possible.

| Density, referred to: 20° C. | g/ml | 1.279 |
|---|---|---|
| Softening point: | °C. | 70 |
| Benzene insolubles: | weight % | 18.2 |
| Elemental analysis: | | |
| weight % | carbon | 91.9 |
| | hydrogen | 4.3 |
| | nitrogen | 1.2 |
| | sulfur | 1.0 |
| | oxygen | 1.6 |
| Atomic C/H Ratio | | 1.78 |

A liquid mixture was produced from 40 weight % coal tar pitch and 60 weight % steamcracker oil. For this purpose the glassy-hard coal tar pitch supplied in pieces having a diameter of 15 to 25 cm. was first ground to particles having a size of 1 to 2 mm. The steamcracker oil was then heated to about 120° C., stirred with a stirrer having 100 to 150 revolutions/min. and then the pulverized coal tar pitch slowly fed in. After stirring for 10 to 15 minutes at the temperature mentioned a sample of the mixture was poured through a sieve having a mesh width of 0.4 mm. There did not remain any pitch particles on the sieve and the solvent action was regarded as concluded. The most important test data of the pitch carbon black feedstock mixture are:

| Density at 20° C. | g/ml | 1.135 |
|---|---|---|
| Benzene insolubles | weight % | 7.1 |

Light steamcracker oil and the mixture prepared above were reacted in parallel in small furnace reactor to form carbon black with the same analytical properties. In the production experiments the following operating data was observed and there was obtained carbon black with the stated analytical test data:

| | Light Steamcracker Oil | Mixture of Light Steamcracker Oil/ Coal Tar Pitch |
|---|---|---|
| Operating and Production Data | | |
| Total air Nm³/h | 21.5 | 21.5 |
| Fuel gas Nm³/h | 2.5 | 2.5 |
| Amount of oil kg/h | 3.96 | 4.55 |
| Amount of carbon black kg/h produced | 1.28 | 1.82 |
| yield % | 32.3 | 40.0 |
| Properties of the Carbon Black Produced | | |
| Iodine adsorption According to DIN 53 552 mg/h | 110 | 107 |
| Dibutyl phthalate Number/ASTM D 2414-70 ml/g | 1.21 | 1.23 |
| Color Strength According to DIN 53 204 | 100 | 100 |
| pH-Value According to DIN 53 200 | 6.7 | 6.6 |

DIN is the abbreviation for German Industrial Standard.

As expected there was reached a substantially high hourly carbon black production with the pitch containing mixture. Also the yield is considerably higher for a carbon black using the mixture which lies at a comparable level in the most important analytical data. Aggravated differences, however, appear if the carbon blacks are incorporated in rubber.

There were used therein the following noted recipes and there were used the operating procedure described in Kautschuk und Gummi, Vol. 19 (1966) No. 8, pages 470–474 and in Vol. 23 (1970) No. 1, pages 7–14 to ascertain the specific quality of the filler.

| Synthetic Rubber Mixture | |
|---|---|
| 100 parts by weight | Buna Huls 15 (a styrene-butadiene copolymer) |
| 40 parts by weight | Carbon Black |
| 3 parts by weight | Zinc Oxide RS |
| 2 parts by weight | Stearic Acid |
| 2 parts by weight | Sulfur |
| 1 part by weight | Vulcazit CZ (CBS) |

| | Light Steamcracker Oil | Mixture of Light Steamcracker Oil/ Coal Tar Pitch 60:40 |
|---|---|---|
| Incubation time $t_I$ sec | 644 | 746 |
| Velocity constant $K_{I'}$ min$^{-1}$ | 196 | 181 |
| Filler Reciprocal Effect Constant $\alpha_F$ | 1.99 | 1.96 |

Here there is already recognized a tendency to a longer incubation time and slower vulcanization. The aggravated difference to be sure first comes to light in carrying out abrasion tests which document the suitability of the carbon blacks for inclusion in tire mixtures.

|  | Relative Abrasion Resistance |
|---|---|
| Standard Carbon Black | 100 |
| Carbon Black Produced From Light Steamcracker Oil | 124 |
| Carbon Black Produced From Light Steamcracker Oil/ Coal Tar Pitch 60:40 | 87 |

In this test there is seen a very great fall off in the most important abrasion test which demonstrates that the carbon black product with pitch is completely unsuitable for wear resistant rubber mixtures.

EXAMPLE 2

Starting from the same basic raw materials as are characterized in Example 1, there was carried out a second series of tests for the production of carbon black. There was a difference, however, that the mixture of 40% coal tar pitch and 60% light steam-cracked oil prepared as in Example 1 was not employed directly but underwent a pretreatment. Therein the mixture heated to 140° C. was sent to a centrifuge which was operated at 40,000 rpm (revolutions per minute). The throughput of the mixture amounted to 15 kg./h. Of the total amount employed, a portion of about 9% was expelled by centrifugal action. The cleaned feedstock (starting material) separated from the expelled portion had the following important data:

| Density at 20° C. | g/ml | 1.133 |
|---|---|---|
| Benzene insolubles | weight % | 0.18 |

It was reacted to carbon black for the further investigations in a furnace reactor in comparison to light steamcracker oil. Therein the following reference data was noted. The analytical data of the carbon black produced are entered below the reference data.

|  | Light steamcracker oil | Light steamcracker oil/coal tar pitch 60:40 Centrifuged |
|---|---|---|
| Operating Data |  |  |
| Total amount of air Nm³/h | 21.5 | 21.5 |
| Amount of fuel gas Nm³/h | 2.5 | 2.5 |
| Amount of carbon black kg/h feedstock | 3.96 | 4.60 |
| Amount of carbon black kg/h | 1.28 | 1.89 |
| Yield % | 32.3 | 41.1 |
| Analytical Data |  |  |
| Iodine adsorption according to DIN 53 552 mg/g | 110 | 109 |
| DBP-Number according to ASTM D 2414-70 ml/g | 1.21 | 1.20 |
| Color strength according to DIN 53 204 | 100 | 99 |
| pH-value according to DIN 53 200 | 6.7 | 6.7 |

As in Example 1 here also there can be recognized the higher carbon black yield and the higher yield with the same level of analytical data for the carbon black produced.

Also in this case the materials were employed in the same test mixture as in Example 1. As important specific rubber data the following data was ascertained:

|  | Carbon black produced from light steamcracker oil | Carbon black produced from light steamcracker oil/coal tar pitch 60:40 Centrifuged |
|---|---|---|
| Incubation time $t_I$ sec | 644 | 650 |
| Velocity constant $K_{V^I}$ min$^{-1}$ | 196 | 197 |
| Filler specific constant $\alpha F$ | 1.99 | 2.00 |

The carbon blacks had practically the same test data. The deciding factor was the results of the abrasion test:

|  | Relative Abrasion Resistance in Rubber Mixture |
|---|---|
| Standard Carbon Black | 100 |
| Carbon black produced from light steamcracker oil | 124 |
| Carbon black produced from steamcracker oil/coal tar pitch 60:40 Centrifuged | 129 |

From these numbers there can be clearly seen the unexpected effect of operating according to the invention. In spite of the higher hourly carbon black output and higher yield there was obtained by the use of the pitch a carbon black with outstanding industrial rubber properties and outstanding resistance to abrasion.

EXAMPLE 3

In this Example there was added the light steam cracked oil of Example 1 and a mixture of 60% steam-cracked oil and 40% coal tar pitch (as described in Example 1). The mixture was subjected to filtration with a filtering apparatus having an average pore size of about 6μ and the filtrate used. The filtrate had the following important test data:

| Density at 20° C. | g/ml | 1.134 |
|---|---|---|
| Benzene insolubles | weight % | 0.57 |

The thus prepared product was again added in a comparison to steam cracked oil as carbon black feedstock in the production of carbon black. The operating conditions in the production of the carbon black and the analytical values of the carbon black produced were as follows:

|  | Light steam cracker oil | Light steamcracker oil/coal tar pitch 60:40 Filtered |
|---|---|---|
| Operating Data |  |  |
| Total amount of air Nm³/h | 21.5 | 21.5 |
| Amount of fuel gas Nm³/h | 2.6 | 2.7 |
| Amount of carbon black kg/h feedstock | 3.84 | 4.58 |
| Amount of carbon black kg/h produced | 1.25 | 1.84 |
| Yield % | 32.5 | 40.2 |
| Analytical Data |  |  |

-continued

|  | Light steam cracker oil | Light steamcracker oil/coal tar pitch 60:40 Filtered |
|---|---|---|
| Iodine adsorption according to DIN 53 5 2 mg/g | 113 | 104 |
| DBP-Number according to ASTM D 2414-70 ml/g | 1.26 | 1.23 |
| Color strength according to DIN 53 204 | 98 | 97 |
| pH-value according to DIN 53 200 | 6.8 | 6.4 |

The industrial rubber tests led to the following results:

|  | Light steam- cracker oil | Light steamcracker oil/coal tar pitch 60:40 Filtered |
|---|---|---|
| Incubation time $t_I$ sec | 590 | 550 |
| Velocity constant $K_{I'}$ min$^{-1}$ | 180 | 190 |
| Filler specific constant $\alpha F$ | 2.08 | 2.04 |

In the decisive test of the abrasion resistance in rubber the filtered mixture was shown to be usable.

|  | Relative Abrasion Resistance in Rubber Mixture |
|---|---|
| Standard Carbon Black | 100 |
| Carbon black produced from Steamcracker oil | 123 |
| Carbon black produced from steamcracker oil/coal tar pitch 60:40 Filtered | 118 |

The abrasion resistance of the carbon black prepared from the filtered coal tar containing mixture was of the same order to magnitude as with that from steam-cracked oil alone, although it appears that the treatment in the centrifuge was somewhat more effective and active.

EXAMPLE 4

The previous examples are based on the preparation of coal tar pitch according to the invention for inclusion in a carbon black feedstock. Coal tar pitch at normal temperatures is solid and glassy. It holds in general for the highest pitch containing pitches, i.e., aromatic condensed products. This example shows that the procedure of the invention can also be used with low pitch products in simple manner.

In the production of gas blacks anthracene oil is vaporized under the influence of temperature, a carrier gas is laden therewith and gas black is produced in the reaction with air in small flames. By the effect of temperature on the anthracene oil in the vaporizer a portion forms high molecular weight material (condensation). Together with the non-vaporizable materials already present in the oil at the vaporizing temperature there results a residue which contains a certain pitch portion (see Ullmann's *Enzyklopadie der technischen chemie*, Vol 14, page 798 bottom). In contrast to the cases described in Examples 1 to 3, however, this pitch is already diluted with excess anthracene oil so that the diluting step of Examples 1 to 3 is eliminated and a direct separation of portion injuring the quality can take place. There was employed a carbon black feedstock having the following test data:

|  | Heavy Anthracene oil | Gas Black Discharge Normal | Gas Black Discharge Centrifuged According to Example 2 |
|---|---|---|---|
| Density, referred to 20° C. g/ml | 1.135 | 1.171 | 1.176 |
| Benzene insolubles weight % | 0.02 | 0.75 | 0.03 |
| Boiling analysis |  |  |  |
| up to 5 Vol % °C. | 289 | 293 | 304 |
| 10 Vol % °C. | 306 | 314 | 318 |
| 20 Vol % °C. | 327 | 335 | 339 |
| 30 Vol % °C. | 335 | 351 | 351 |
| 40 Vol % °C. | 345 | 362 | 362 |
| 50 Vol % °C. | 353 | 373 | 372 |
| 60 Vol % °C. | 362 | 383 | 382 |
| 70 Vol % °C. | 375 | 410 | 410 |
| 80 Vol % °C. | 383 | — | — |

Carbon black was produced in a small furnace apparatus from heavy anthracene oil, the above defined gas black residue and the same residue after centrifuging according to Example 2. The operating conditions and the analytical properties of the carbon black produced are set forth below:

| Operating Data | Heavy Anthracene Oil | Gas Black Residue Normal | Gas Black Residue Centrifuged |
|---|---|---|---|
| Total amount of air Nm$^3$/h | 21.5 | 21.5 | 21.5 |
| Amount of fuel gas Nm$^3$/h | 3.6 | 3.6 | 3.6 |
| Amount of carbon black feedstock kg/h | 4.68 | 4.81 | 4.84 |
| Amount of carbon black produced kg/h | 1.99 | 2.19 | 2.22 |
| Yield % | 42.5 | 45.5 | 45.8 |

| Analytical Data | Heavy Anthracene Oil | Gas Black Residue Normal | Gas Black Residue Centrifuged |
|---|---|---|---|
| Iodine adsorption according to DIN 53 532 mg/g | 125 | 121 | 121 |
| DBP-Number according to ASTM D 2414-70 ml/g | 1.27 | 1.23 | 1.26 |
| Color strength according to DIN 53 204 | 97 | 98 | 97 |
| pH-value according to DIN 53 200 | 6.8 | 6.7 | 6.5 |

The industrial rubber tests were carried out with a test mixture corresponding to that in Example 1.

|  | Carbon black produced from heavy anthracene oil | Carbon black produced from gas black residue | Carbon black produced from centrifuged gas black residue |
| --- | --- | --- | --- |
| Incubation time $t_I$ sec | 600 | 620 | 590 |
| Velocity constant $K_V{}^I$ min$^{-1}$ | 206 | 200 | 207 |
| Filler specific Constant $\alpha F$ | 2.17 | 2.18 | 2.14 |

A clearer distinction is again found in the abrasion data of the carbon black containing rubber mixtures:

|  | Relative Abrasion Resistance |
| --- | --- |
| Standard Carbon Black | 100 |
| Carbon black from heavy coal tar oil (anthracene oil) | 145 |
| Carbon black from gas black residue | 129 |
| Carbon black from centrifuged gas black residue | 140 |

Heavy anthracene oil at present is rightly looked at as the highest quality carbon black feedstock. With the gas black residue treated according to the invention the hourly carbon black output and yield is increased about 8–12% compared to heavy anthracene oil, without significantly deteriorating the abrasion resistance.

What is claimed is:

1. Carbon black having a high abrasion resistance in rubber compositions prepared by reacting (1) a carbon black forming feedstock prepared by a process consisting essentially of dissolving aromatic pitch in a thin liquid hydrocarbon carbon black feedstock having a viscosity at 100° C. of 5 to 30 cp, there being present suspended matter in the mixture thus formed, mechanically separating suspended matter from the mixture obtained and recovering the pitch containing feedstock having viscosity at 100° C. of 40 to 300 cp with (2) air and (3) a fuel gas.

2. Carbon black according to claim 1 wherein the thin liquid hydrocarbon feedstock is steam cracked oil or anthracene oil.

3. Carbon black according to claim 2 wherein the pitch is coal tar pitch.

4. Carbon black according to claim 1 wherein the pitch used in its preparation is coal tar pitch.

5. Carbon black according to claim 4 wherein the carbon black forming material employed to make the carbon black has benzene insolubles below 0.6 weight %.

6. Carbon black according to claim 1 wherein the carbon black forming material employed to make the carbon black has benzene insolubles below 0.6 weight %.

7. Carbon black having a high abrasion resistance in rubber compositions prepared by reacting (1) a carbon black forming feedstock prepared by a process consisting essentially of mechanically separating suspended matter from a thermally cracked aromatic pitch containing thin liquid hydrocarbon carbon black feedstock having a viscosity at 100° C. of 40 to 300 cp, there being present suspended matter in the mixture thus formed, the feedstock in the absence of the pitch having a viscosity at 100° C. of 5 to 30 cp, and recovering the pitch containing feedstock with (2) air and (3) a fuel gas.

8. Carbon black according to claim 7 wherein the thin liquid hydrocarbon feedstock is steam cracked oil or anthracene oil.

9. Carbon black according to claim 8 wherein the pitch is coal tar pitch.

10. Carbon black according to claim 7 wherein the carbon black forming material employed to make the carbon black has benzene insolubles below 0.6 weight %.

11. Carbon black according to claim 7 wherein the pitch is coal tar pitch.

12. Carbon black according to claim 11, wherein the carbon black forming material employed to make the carbon black has benzene insolubles below 0.6 weight %.

* * * * *